(12) United States Patent
Cai et al.

(10) Patent No.: US 9,348,860 B2
(45) Date of Patent: May 24, 2016

(54) METHOD FOR ENCODING A MESH MODEL, ENCODED MESH MODEL AND METHOD FOR DECODING A MESH MODEL

(75) Inventors: Kangying Cai, Beijing (CN); Jiang Tian, Beijing (CN); Wei Liang Meng, Beijing (CN)

(73) Assignee: THOMSON LICENSING, Issy les Moulineaux (FR)

( * ) Notice: Subject to any disclaimer, the term of this patent is extended or adjusted under 35 U.S.C. 154(b) by 292 days.

(21) Appl. No.: 14/111,171

(22) PCT Filed: Apr. 12, 2011

(86) PCT No.: PCT/CN2011/000643
§ 371 (c)(1),
(2), (4) Date: Oct. 10, 2013

(87) PCT Pub. No.: WO2012/139249
PCT Pub. Date: Oct. 18, 2012

(65) Prior Publication Data
US 2014/0040215 A1   Feb. 6, 2014

(51) Int. Cl.
*G06T 15/00* (2011.01)
*G06F 17/30* (2006.01)
(Continued)

(52) U.S. Cl.
CPC .......... *G06F 17/30371* (2013.01); *G06T 9/005* (2013.01); *G06T 9/40* (2013.01); *G06T 17/005* (2013.01)

(58) Field of Classification Search
CPC ......... G06T 17/005; G06T 9/005; G06T 9/04; G06F 17/30371
USPC ................................... 345/419, 423; 707/693
See application file for complete search history.

(56) References Cited

U.S. PATENT DOCUMENTS 5,983,224 A    11/1999   Singh et al.
7,716,152 B2   5/2010    Balderer et al.
(Continued)

FOREIGN PATENT DOCUMENTS

CN   1787418      6/2006
CN   101661631    3/2010
(Continued)

OTHER PUBLICATIONS

Shikare et al., "Compression of Large 3D Engineering models using automatic discovery of repeating geometric features", 6th Int. Fall Workshop on Vision, Modelling and Visualization, Nov. 21-23, 2001, pp. 233-240.
(Continued)

*Primary Examiner* — Phu K Nguyen
(74) *Attorney, Agent, or Firm* — Tutunjian & Bitetto, P.C.

(57) ABSTRACT

Many 3D mesh models have a large number of small connected components that are repeated in various positions, scales and orientations. The respective positions are defined by the position of at least one reference point per component. For an enhanced encoding of the positions of the respective reference points, a given space is divided into segments and the number of points lying in each particular segment is determined. When a cell with at least n points is subdivided into child cells, an indication is added indicating if all points of a parent are in only one child cell. If so, the index of the only non-empty child node is encoded, while otherwise the number of points in one of the two child cells is decremented and encoded. The invention avoids non-effective subdivisions of a cell, and therefore improves the compression efficiency.

22 Claims, 5 Drawing Sheets ssd1
a)

ssd2 ssd3 sd1 sd2 sd3 b)

(51) Int. Cl.
*G06T 17/00* (2006.01)
*G06T 9/00* (2006.01)
*G06T 9/40* (2006.01)

(56) References Cited

U.S. PATENT DOCUMENTS

| | | | |
|---|---|---|---|
| 7,734,714 | B2 | 6/2010 | Rogers |
| 7,836,258 | B2 | 11/2010 | Brown et al. |
| 8,610,706 | B2 * | 12/2013 | Zhou et al. ............ G06T 17/005 345/419 |
| 8,830,254 | B2 * | 9/2014 | Noon ................. G06F 17/30958 345/440 |
| 8,928,661 | B2 * | 1/2015 | Grenfell ................. G06T 17/20 345/423 |
| 2010/0082704 | A1 | 4/2010 | Zhou et al. |

FOREIGN PATENT DOCUMENTS

| | | |
|---|---|---|
| CN | 101819684 | 9/2010 |
| CN | 101877128 | 11/2010 |
| CN | 101894395 | 11/2010 |
| JP | 2008-123497 | 5/2008 |
| KR | 20090097057 | 9/2009 |
| WO | WO2010149492 | 12/2010 |

OTHER PUBLICATIONS

Vidal et al., "Simple Empty-Space Removal for Interactive Volume Rendering", INRIA-Evasion, Montbonnet-Saint-Martin, Journal of Graphics and Tools, vol. 3, No. 2, pp. 21-37.

Zhou et al., "The hB-pi tree an optimized comprehensive access method for frequent-update multi-dimensional point data", Scientific and Statistical Database Management. 20th International Conference, SSDBM 2008, Springer-Verlag, Berlin, pp. 331-147.

Olivier DeVillers, Pierre-Marie Gandoin, fiGeometric compression for interactive transmissionfl, IEEE Visualization, 2000,pp. 319-326.

Jingliang Peng, C.-C. Jay Kuo, fiGeometry-guided progressive lossless 3D mesh coding with octree (OT) decompositionfl, 2005.

Search Report Dated Jan. 19, 2012.

* cited by examiner

METHOD FOR ENCODING A MESH MODEL, ENCODED MESH MODEL AND METHOD FOR DECODING A MESH MODEL

This application claims the benefit, under 35 U.S.C. §365 of International Application PCT/CN2011/000643, filed Apr. 12, 2011, which was published in accordance with PCT Article 21(2) on Oct. 18, 2012 in English.

FIELD OF THE INVENTION

This invention relates to a method for encoding a mesh model, a corresponding encoder apparatus, an encoded mesh model, a method for decoding a mesh model and a corresponding decoder apparatus.

BACKGROUND

Various algorithms have been proposed to compress 3D meshes efficiently since the early 1990s. Early work however mostly concentrates on compressing single connected 3D models with smooth surface and small triangles. In most of today's large 3D engineering models there are a large number of small to medium sized connected components, each having up to a few hundred polygons on average. Often this type of models has a number of geometric features or components that are repeated in various positions, scales and orientations. Such models are called multi-connected. The components are compressed separately, causing a relatively inefficient compression. The compression performance can be greatly increased by removing the redundancy between different connected components. Various methods for automatically discovering repeating geometric features in large 3D engineering models are known. Their respective positions are defined by the 3D position of at least one reference point per component. However, one problem is how to encode the position of the respective reference points.

Most of the efficient compression algorithm for spatial points are spatial tree based, e.g. kd-tree based (as in [OG02]: "Geometric compression for interactive transmission" by O. Devillers, P. Gandoin, IEEE Visualization, 2000, pp. 319-326) or octree based (as in [PK05]: "Geometry-guided progressive lossless 3D mesh coding with octree (OT) decomposition" by J. L. Peng, C.-C. Jay Kuo, ACM SIGGRAPH/ACM Transactions on Graphics 24(3), 609-616, 2005).

These algorithms divide a given space into segments, and provide the number of input spatial points lying in each particular segment. Thus, they organize the input spatial points by an implicit spatial tree. Then they traverse the tree structure and record the necessary information for later restoring the input points. When building the spatial tree, a cell is recursively subdivided, until each non-empty cell is small enough to contain only one vertex and enable a sufficiently precise reconstruction of the point position.

Cells correspond to nodes. Initially, the entire bounding box of all 3D points is regarded as a cell or node. As the point positions can be restored from the bounding box of the corresponding cells, the spatial tree based algorithms can achieve multi-resolution compression at the same compression ratio as single-resolution compression algorithms.

An example of the method used in [OG02] is shown in FIG. 1. Each time when a parent cell is subdivided into two child cells, the number of points in one (e.g. left or upper) of the two child cells is encoded. If the parent cell contains p points, the number of points in one of the child cells can be encoded using $\log_2(p+1)$ bits with an arithmetic coder.

Different from that, [PK05] subdivides a non-empty cell into eight cells, and encodes only the indices of non-empty child-cells after each cell subdivision. In order to improve coding efficiency, [PK05] estimates the pseudo-probability of various T-tuples to be the group of non-empty child cells. The traversal orders of child cells are according to a probability descending order.

However, for enabling compact storage and fast transmission, it is a continuous problem how to increase the efficiency of compression algorithms.

SUMMARY OF THE INVENTION

The present invention is based on the recognition of the following fact: the efficiency of organizing and compressing spatial points by a spatial tree mainly depends on whether each child tree node includes fewer data points than its parent tree node. If a child node contains the same data points as its parent (or the same number of data points as its parent, respectively), the corresponding subdivision is not effective. Such non-effective subdivisions increase the amount of coded data, and thus decrease the compression efficiency. The more subdivisions are non-effective, the lower is the compression ratio.

An advantage of the present invention is that it can avoid the decrease in compression efficiency that is caused by the non-effective subdivisions, and thus improve the compression.

According to the invention, the input points of a mesh model are first clustered according to their spatial positions. Each cluster contains a set of points that are spatially aggregated. Then each cluster is compressed using a spatial tree (such as kd-tree or octree). For each subdivision, determining steps determine two conditions: first, the number of points in the parent cell, and second, whether the subdivision is effective, i.e. if all the resultant child nodes have fewer data points than the parent node. In one embodiment, if a parent cell has less than a given minimum number of points in total, any subdivision is conventionally encoded, i.e. the code indicates the number of points in a defined one of the child cells. However, subdivisions of parent cells with at least said minimum number of points are encoded differently.

The minimum number of points, which is used in deciding whether conventional encoding or one of the coding modes with the mode indication is used, depends on the number of child cells per parent cell and per splitting operation. For a division of a parent cell into two child cells, the minimum number is four. For a division of parent cells into more than two child cells, the minimum number is higher than four. Thus, for all examples given below, although the minimum number of points upon which a coding mode is decided (or coding mode decision limit) is four, this number may be different if a division of parent cells results in more than two child cells.

If a parent cell has p points in total, p being at least four, and the subdivision is effective, so that there are $p_1$ points ($0 < p_1 < p$) in a defined one of the child cells, then the effective subdivision is encoded by an encoded value of $p_1 - 1$, i.e. the number of points in the child cell minus one.

If a parent cell has p points in total, p being at least four, and the subdivision is non-effective, all points are in only one of the child cells, and the subdivision is encoded as follows: instead of a number of points, the code indicates the index of the non-empty child node, using a pre-defined indexing scheme.

In order to differ between the two encoding modes when a parent cell has at least four points (i.e. effective or non-effective subdivisions), an additional mode indication per tree node is inserted into the result code or output data stream. The mode indication indicates whether or not the corresponding subdivision is effective.

The encoding results in a new kind of encoding format, which can be considered as a spatial tree and comprises for each tree node with at least four points an indication for indicating whether the corresponding subdivision is effective, i.e. whether or not all points of the divided parent cell are in only one child cell. For each subdivision, the compressed data in the above-described format follows, i.e. the number of points in one of the child cells (if the total number of points in parent cell is below four), or the number of points in the child cell decremented by one (if the total number of points in parent cell is at least four and the subdivision is effective), or the index of the only non-empty child node (if the total number of points in parent cell is at least four and the subdivision is non-effective). Advantageously, the index uses fewer bits than the encoded number of points if the number of points is at least four.

During the decoding of data in the encoding format according to the invention, when traversing the spatial tree, for each subdivision the number of points in the current parent cell is calculated or determined, and an indication (e.g. 1 bit) is analyzed in order to detect whether the current subdivision is effective.

In one embodiment, the invention relates to a method for encoding points of a mesh model, comprising steps of determining a total number of points and inserting the determined total number of points in the code, wherein a pre-defined code word length is used, clustering the points according to their spatial coordinates into one or more clusters, and encoding the clustered points using a hierarchical tree, wherein the encoding comprises steps of defining a bounding box around the clusters (i.e. around all the points of the model), recursively dividing the bounding box, wherein each dividing step divides a parent cell into a pre-defined number of child cells (at least two), and for each dividing step, determining for a current parent cell the number of points included, determining whether or not all points of the parent cell are within a single child cell, and encoding an indication that indicates the result of the determining steps, as follows.

If the determining yields that the total number of points in the parent cell is below four, then the number of points that are within a particular (pre-defined) one of the child cells is inserted into the code.

If the determining yields that the total number of points in the parent cell is above four and that the points of the parent cell are distributed to at least two of the child cells, then the dividing step is effective, and a first indication, indicating the effectiveness of the division (e.g. by a single bit set to one), and the number of points that are within a particular (pre-defined) one of the child cells are inserted into the code.

If the determining yields that the total number of points in the parent cell is above four, and that all points of the parent cell are within a single child cell, then the dividing step is non-effective, and a second indication is inserted into the code, indicating the non-effectiveness of the division (e.g. by a single bit set to zero), an index of the single child cell that contains all points of the parent cell is determined, and the index is inserted into the code.

If the splitting results in more than two child cells, the coding mode decision limit may be higher than four, and the index is encoded before insertion. The amount of bits that is used for encoding the index can be derived from the number of child cells that result from a splitting step.

In one aspect, a method for decoding points of a mesh model comprises steps of extracting from an encoded data set at least a value and first data being position data of a plurality of points, the value representing a total number of points and the first data defining a plurality of code words, wherein each code word refers to one of a plurality of recursive divisions of a bounding box into cells, and each division divides a current parent cell into two or more child cells, and determining the positions of said points based on said value and said first data, wherein at least some of code words comprise an indication (one bit) for indicating whether or not a current cell division step is effective. The length of each code word can be fixed or variable; if it is variable, its length and value can be calculated during the decoding, according to a given rule.

For each current parent cell, the total number of points that it includes is determined. In one embodiment, it was calculated and stored before, and it is retrieved from the storage. Also, the number of bits that are used for encoding the determined number of points is calculated; it is later used for determining code word lengths. If the total number of points is below four, the corresponding code word does not have the above-described indication, and is interpreted as the number of points in a pre-defined one of the child cells. If the total number of points is at least four, the corresponding code word begins with said indication, and the indication is evaluated. Depending on the indication, the remaining bits of the code word can have two meanings: either they are a decremented number of points that are positioned within a pre-defined one of the child cells that result from the current division of the current parent cell. Since it is decremented, it needs to be incremented by one for obtaining the actual number of points. Or the remaining bits of the code word are an index of a child cell resulting from the current division of the current parent cell. The index is an identifier of one child cell that includes all the points of the parent cell. If the code word length is variable, the above-determined number of bits (plus one bit for the flag) is the current code word length. If the code word length is fixed, such as for the first code word (i.e. the total number of points in the model), it is pre-defined. During decoding, the position of each vertex is iteratively localized in successively smaller child cells, until upon a given termination condition the decoding is terminated.

The invention can be used for points that are reference points of components in multi-component models and that denote clusters of vertices of the models. In principle, the invention can also be used for points that are the vertices of any mesh model, or any other large groups of points that are defined by coordinates.

Generally it is necessary to keep track of the number of points within parent cells, at least within cells that are not empty. E.g. the number of points in a non-empty child cell is stored until, after the next division, the child cell has become a parent cell. Then the number is retrieved from the storage when determining the number of points in the parent cell.

The invention further relates to an apparatus for encoding, comprising clustering means for clustering the points according to their spatial coordinates into one or more clusters, and encoding means for encoding the clustered points, wherein the encoding means comprises an initialization unit for defining a bounding box around the clusters, a recursive division unit for recursively dividing the bounding box, wherein each dividing step of said recursive dividing splits a parent cell into a pre-defined number of child cells, a point distribution determining unit for determining the number of points for each dividing step and for each current parent cell to be divided and for determining if the number of points per parent cell is at least four, and an encoding unit for encoding the number of points if the number is below four, as described above, and for encoding the decremented number of points in a child cell or a child cell index, as described above, if the number is at least four.

Further, the invention relates to a decoder for decoding a mesh model, comprising extraction means for extracting from an encoded data set at least first data and an initial value indicating a total number of points, recursive dividing means for recursively dividing a bounding box into cells, wherein each of the recursive division divides a current parent cell into child cells, and determining means for determining the positions of said points according to said child cells. The determining means comprises a unit for determining the number of points in a current parent cell, a coding mode detection unit for detecting a coding mode according to the determined number of points in the current parent cell, a code word length detection unit for deriving the length of each code word from the number of points in the current parent cell, and a decoding unit for decoding the next code word, as described above.

In one aspect, the invention relates to a computer readable medium having stored thereon executable instructions to cause a computer to perform a method comprising the above-mentioned encoding steps. In one aspect, the invention relates to a computer readable medium having stored thereon executable instructions to cause a computer to perform a method comprising the above-mentioned decoding steps.

In one embodiment, the invention relates to an encoded mesh model comprising a plurality of repetitive connected components, wherein the encoded mesh model comprises encoded data of at least the following:
an instance of each repetitive connected component,
a total number of encoded connected components,
positions of a plurality of repetitions of said repeating connected components, the positions being encoded as a tree structure (e.g. kd-tree), and data defining a bounding region for the mesh model. The bounding region is the initial parent cell to which the tree structure refers. The positions that are encoded as a tree use the above-described encoding. I.e., the encoding includes a code word for each node of the tree structure, wherein for nodes with at least four points the code word begins with an indication that has a first value if the points of the current parent cell are distributed to at least two child cells, and that has a different second value if the points of the current parent cell are in a single child cell, and wherein the remaining bits of the code word denote either a number of points that are positioned within a pre-defined one of the child cells (if the indication has the first value) minus one, or denote an index of a child cell of the current parent cell, being the child cell that includes all the points of the parent cell (if the indication has the second value).

Advantageous embodiments of the invention are disclosed in the dependent claims, the following description and the figures.

BRIEF DESCRIPTION OF THE DRAWINGS

Exemplary embodiments of the invention are described with reference to the accompanying drawings, which show in
FIG. 1 the principle of kd-tree coding in a 2D example.

DETAILED DESCRIPTION OF THE INVENTION

Figure 1:
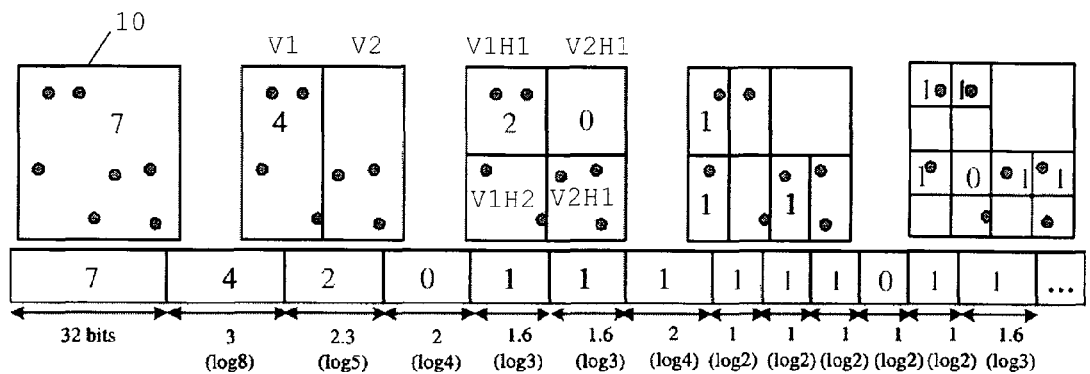

FIG. 1 shows the principle of conventional kd-tree coding in a 2D case. The points of the 2D model are enclosed by a bounding box 10. Seven points are positioned within the parent cell. The kd-tree encoding algorithm starts with encoding the total number of points using a predefined number of bits, and then subdivides the cells recursively. Each time it subdivides a parent cell into two child cells, it encodes the number of points in one of the two child cells. The below example encodes the number of points in the left child cell (after vertical splitting) or in the upper cell (after horizontal splitting). These conventions may be changed, independently from each other. If a parent cell contains p points, the number of points in one of the child cells is encoded using $\log_2(p+1)$ bits with an arithmetic coder. This subdivision is recursively applied, until each non-empty cell is small enough to contain only one point and enable a sufficiently precise reconstruction of the point position. For compressing the positions of all the points of a mesh model (whether the points are vertices or cluster reference points), the algorithm begins with the entire bounding box 10 of all the positions being regarded as a current parent cell for the first division step.

In the example of FIG. 1, the first encoded value is the total number of points (7), which is encoded using 32 bits. Then vertical splitting is applied, so that a left child cell V1 and a right child cell V2 are obtained. In the next coding step, the number of points in the left child cell V1, which is four, is encoded. The number of bits used for the encoding is determined by the number of points within the parent cell: it is $\log_2(7+1)=3$ bits. Thus, the second code word is the number four, which is encoded using three bits. From the number of points in the parent cell and the number of points in the left child cell V1, the number of points in the right child cell V2 can be calculated to be 7−4=3. Therefore it needs not be encoded.

In the next step, horizontal splitting is applied to the child cells of the previous step. The left child cell V1, which is now a current parent cell V1, is split into an upper child cell V1H1 and a lower child cell V1H2. Likewise, the right child cell V2, which is now a parent cell V2, is split into an upper child cell V2H1 and a lower child cell V2H2. The encoding continues with the upper left child cell V1H1, which has two points. Thus, the number two is encoded next, wherein $\log_2(4+1)=$ 2.3 bits are used in an arithmetic coder (or three bits after round-up). As described above, the number of points in the lower left child cell V1H2 needs not be encoded, since it can be deduced from the number of points in the left cell V1 and in the upper left child cell V1H1. Then, the same procedure is applied to the right cell V2, which results in encoding a zero using two bits. As shown in FIG. 1, two more splitting steps are necessary until each point is in a separate cell, and even more steps are necessary until each point is sufficiently localized within its cell. Each step increases the accuracy of the point position encoding, but requires encoding a growing number of 1s or 0s. Depending on a required accuracy, the number of additional steps may be high.

The points may be vertices or cluster reference points. I.e. the present invention may apply an enhanced kd-tree coding algorithm at least for encoding vertex positions or for encoding positions of repeating connected components. Further, the enhanced kd-tree algorithm may in principle also be used for encoding any kind of spatial position in a given 1D, 2D or 3D space.

Figure 2:
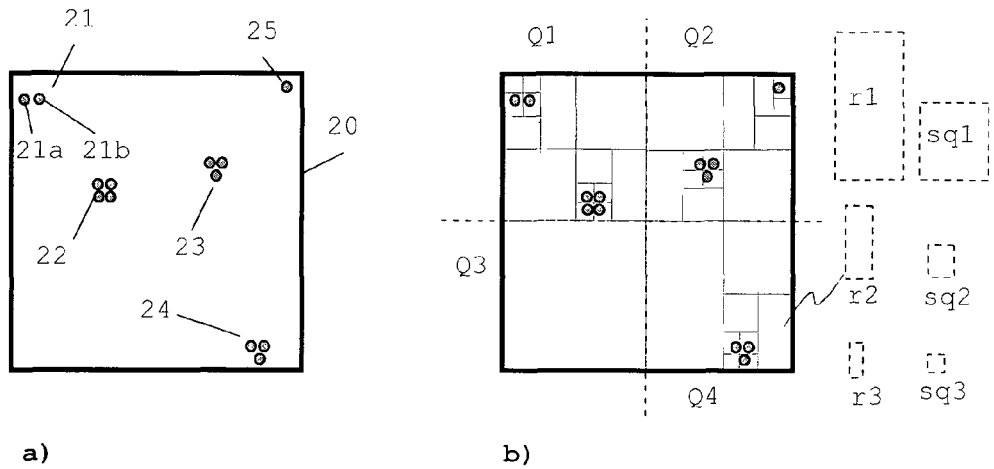
FIG. 2 organization of data points in a kd-tree using effective and non-effective subdivisions.
Figure 6:
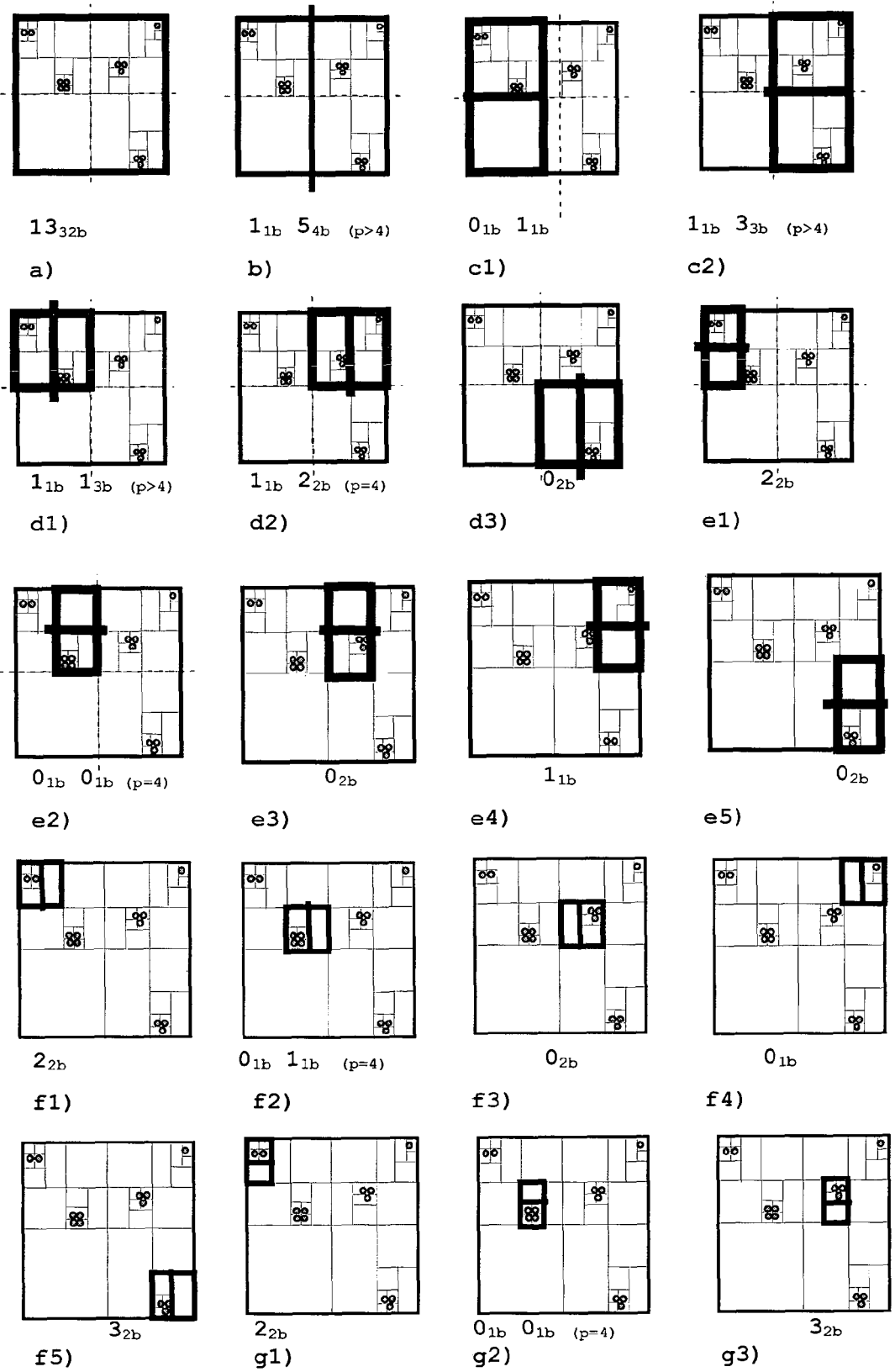
FIG. 6 details of a code example.
Figure 6:
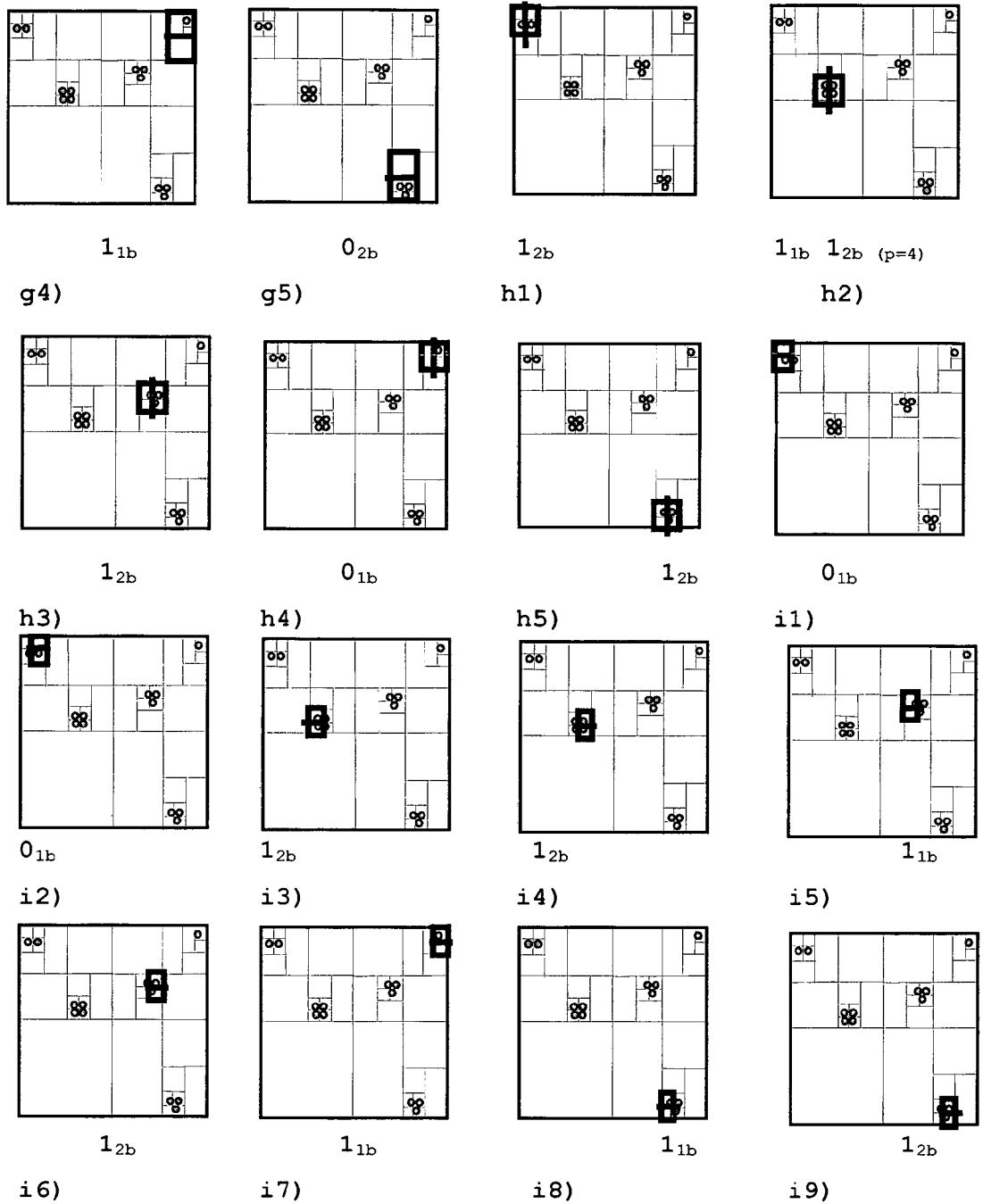

FIG. 2 shows a kd-tree example where several points 21-25 are positioned within the bounding box 20 of a 2D mesh model. The invention can also be applied to 1D models or 3D models. The application of the principle to the encoding of 3D mesh models is described further below. The below-described steps are also shown in FIG. 6. As is the case in many large mesh models, the positions of the points are very unevenly distributed within the bounding box. In this example, the enhanced kd-tree coding algorithm is applied for encoding the positions of the points, and it is assumed that a required accuracy is such that five initial division or splitting steps are required before the clusters are sufficiently localized. The accuracy can be increased by increasing the number of splitting steps, or decreased by decreasing the number of splitting steps. Further, it is defined by convention that in this example the effectiveness indication of an effective division is encoded by "1" (1=effective, 0=non-effective), and that child cell indices are encoded by "1" for the upper or the left child cell respectively and by "0" for the lower or the right child cell respectively. Note that these conventions may be defined differently without affecting the invention or the efficiency of the code.

The first code word is the total number of points, using a pre-defined number of bits (e.g. 32 bits, depending on a potential total number of points). Further, the total number of points in the model is determined, which is thirteen, and it is determined that the total number of points is more than three. In the first division step, the parent cell being the bounding box 20 is vertically divided into two rectangles, left (Q1+Q3) and right (Q2+Q4), see FIG. 6 $b$). Since the total number of points is at least four, the coding mode bit ("effective" bit) according to the invention is used, and since both resulting rectangles contain points, the division is effective. Thus, the second code word is an effective indication (1="effective"), followed by the value five, which is the number of points in the left child cell (six) decremented by one. It is encoded using four bits, since four bits are required for encoding the total number of points in the parent cell (int($\log_2(13)$)=4). That is, in the example of FIG. 3 the beginning of the code will be as follows: 13 (total number of points, 32 bit), 1 (effective bit), 5 (number of points in left child cell of $1^{st}$ generation minus one, 4 bit).

The second division step performs horizontal division of the rectangles, so that four squares Q1, ..., Q4 result, see FIG. 6 $c1$) and $c2$). From the previous step it is known that each of the two rectangle parent cells contains at least 4 points. Concerning the left rectangle, the division is non-effective since a single one of the resulting square child cells Q1,Q3 contains all points. While conventional kd-tree coding would require the number of points in the upper child cell Q1 to be encoded (using 3 bits), the enhanced encoding algorithm according to the present invention uses only an indication showing that the division is non-effective, and an index of the child cell that contains all the points.

The child cell index uses n=$\log_2(m)$ bits, wherein m is the number of resulting child cells of a parent cell. Since there are two child cells in this example, the index uses only $\log_2(2)$=1 bit. In another embodiment, each division step splits a parent cell into m child cells of equal size, so that more bits are used for indicating a child cell index. In a case where the number m is a higher power of 2, such as 4, 8, 16 etc., which provides a more effective code than m not being a power of 2, the division can be considered as an accumulation of several simple division steps (in same dimension). However, processing speed may be increased if these several steps are performed simultaneously. This accumulation is useful e.g. where points are so sparsely distributed (compared with a spatial resolution to be achieved) that sequences of several non-effective divisions are very probable to appear. In other cases it may be better to select n=2.

Returning to the example of FIG. 2, where parent cells are split into two child cells, the effective indication has only one bit, so that the following code word for the left rectangle Q1+Q3 comprises only two bits, namely "01" (0=non-effective indication, 1 bit, and 1=child cell index, 1 bit). An effectiveness indication (effective/non-effective) and subsequent bits, that define either a child cell index or a number of points in one of the child cells, can generally be considered as a single code word. Thus, code words have variable length. Advantageously, a code word that comprises a cell index is usually shorter than a code word that comprises a value representing an amount of points.

The division of the right rectangle is effective, and it is therefore encoded by "1" (effective indication, 1 bit) and "3" (number of points in upper child cell Q2 minus one, using 3 bits (since $\log_2$(number_of_bits_in_parent_cell)=$\log_2(7)$= 3), as shown in FIG. 6 $c2$).

In the following, short writing of the form "value$_{number\_of\_bits}$" is used. For example, a value of five that is encoded by three bits is written as $5_{3b}$.

In the next step, a new generation of child cells begins and the splitting dimension is changed. Each of the squares Q1-Q4 is vertically split, so that rectangles of the size r1 result, see FIG. 6 $d1$)-$d3$). For each of Q1 and Q2, the total number of points is at least 4 and the division is effective (FIG. 6 $d1$),$d2$)). The number of points in the left rectangles is 2 and 3 respectively. They are encoded by $1_{1b}$-$1_{3b}$ and $1_{1b}$-$2_{2b}$ respectively. Q3 is skipped, since from the above-mentioned fact that the vertical division of Q1+Q3 was non-effective and the index of that division, it is clear that Q3 is empty. The remaining cell Q4 has only three (i.e. below four) points 24, so that it is encoded by $0_{2b}$ (for "all points are in the right-hand child cell"), see FIG. 6 $d3$).

That is, in the example of FIG. 3, the beginning of the code will now be as follows:
$13_{32b}$ (total number of points)-$1_{1b}$ (effective indication)-$5_{4b}$ (left child cell $1^{st}$ generation)-$0_{1b}$-$1_{1b}$ (non-effective indication and index for upper child cell)-$1_{1b}$ (effective indication)-$3_{3b}$ (number of points in Q2)-$1_{1b}$-$1_{3b}$-$1_{1b}$-$2_{2b}$ (non-effective bits and number of points in rectangle child cells of Q1 and Q2)-$0_{2b}$ (all points in right-hand rectangle child cell of Q4).

In the following division step, each of the (non-empty) rectangles of size r1 is horizontally divided into squares of size sq1, as shown in FIG. 6 $e1$)-$e5$). Thus, starting from the upper left, the next code words are $2_{2b}$-$0_{1b}0_{1b}$-$0_{2b}$-$1_{1b}$ for the upper half of the bounding box, and (skipping the empty Q3 and the empty left half of Q4) $0_{2b}$ for the lower half of the bounding box. E.g. the last value $0_{2b}$ means that after the horizontal division of the right half of Q4 all its points are in the lower child cell, see FIG. 6 $e5$), since the total number of points before the division is below four.

In the following division step, each of the (non-empty) squares of size sq1 is vertically divided into rectangles of size r2, as shown in FIG. 6 $f1$)-f5). Thus, starting from the upper left, the next code words are $2_{2b}$-$0_{1b}1_{1b}$ (in Q1)-$0_{2b}$-$0_{1b}$ (in Q2)-$3_{2b}$ (in Q4). E.g. the value $0_{1b}1_{1b}$ (see FIG. 6 $f2$)) means that the division of the square of size sq1 is non-effective (i.e. "0") and in the only occupied rectangle of size r2 is on the left-hand side (i.e. "1"), knowing that the total number of points in the current parent cell has been previously determined to be at least four.

In the following division step, each of the (non-empty) rectangles of size r2 is horizontally divided into squares of size sq2, as shown in FIG. 6 g1)-g5). Starting from the upper left, the next code words are $2_{2b}$-$0_{1b}$-$0_{1b}$ (in Q1)-$3_{2b}$-$1_{1b}$ (in Q2)-$0_{2b}$ (in Q4). Note that only in the division shown in FIG. 6 g2) the number of points in the parent cell is more than three, so that the effectiveness indication is used. In FIG. 6, these cases are marked by (p=4) or (p>4).

In the following division step, each of the (non-empty) squares of size sq2 is vertically divided into rectangles of size r3, as shown in FIG. 6 h1)-h5). Starting from the upper left, the next code words are $1_{2b}$-$1_{1b}1_{2b}$ (in Q1)-$1_{2b}$-$0_{1b}$ (in Q2)-$1_{2b}$ (in Q4).

Finally, in the last division step, each of the (non-empty) rectangles of size r3 is horizontally divided into two squares of size sq3, as shown in FIG. 6 i1)-i9). Starting from the upper left, the next code words are $0_{1b}$-$0_{1b}$-$1_{2b}$-$1_{2b}$ (in Q1)-$1_{1b}$-$1_{2b}$-$1_{1b}$ (in Q2)-$1_{1b}$-$1_{2b}$ (in Q4).

All child cells having same size are considered as one child cell generation. E.g. in FIG. 2, if the bounding box 20 is considered the $1^{St}$ generation (parent generation), and the squares Q1, ..., Q4 belong to the $3^{rd}$ generation. All squares of size sq1 (e.g. the left upper square and the right lower square of Q1, the right upper square and left lower square of Q2, and the right lower square of Q4) all belong to the same child cell generation, namely the $5^{th}$ generation. Note that the sequence of processing of the cells of any particular generation is subject to convention (see further below), and may be changed without modifying the code efficiency.

With the above encoding, all points can be localized in the bounding box within the accuracy of squares of size sq3. For the complete model, the encoding uses 102 bits: $13_{32b}$-$1_{1b}5_{4b}$-$0_{1b}1_{1b}$-$1_{1b}3_{3b}$-$1_{1b}$-$1_{3b}$-$1_{1b}$-$2_{2b}$-$0_{2b}$-$2_{2b}$-$0_{1b}0_{1b}$-$0_{2b}$-$1_{1b}$-$0_{2b}$-$2_{2b}$-$0_{1b}1_{1b}$-$0_{2b}$-$0_{1b}$-$3_{2b}$-$2_{2b}$-$0_{1b}0_{1b}$-$3_{2b}$-$1_{1b}$-$0_{2b}$-$1_{2b}$-$1_{1b}1_{2b}$-$1_{2b}$-$0_{1b}$-$1_{2b}$-$0_{1b}$-$0_{1b}$-$1_{2b}$-$1_{2b}$-$1_{1b}$-$1_{2b}$-$1_{1b}$-$1_{1b}$-$1_{2b}$.

Conventional encoding of this simple example, i.e. using the known kd-tree algorithm, would require one more bit. Thus, the invention increases the code efficiency.

The more non-effective subdivisions are made, the higher is the compression ratio improvement compared with conventional methods, and the more advantageous is the present invention. Non-effective subdivisions usually occur in two cases: One is when the spatial data points show significant multiple spatial aggregation, as in the above-described example. Even for the spatial point sets with single spatial aggregation (i.e. single points), some non-effective subdivisions are unavoidable. This is true especially when a cell contains only one point, but is still too big to reconstruct the point position, so that further non-effective subdivisions are required for increasing the spatial resolution. Thus, the larger the number of points is and the more significant the clustering (i.e. spatial aggregation) of the points is and the higher the target spatial resolution is, the more bits are saved by the encoding according to the invention. In other words, the coding efficiency increases when the spatial distribution of the points is less homogeneous, i.e. more non-effective subdivisions occur. This becomes more probable when the number of points increases.

Advantageously, the invention achieves considerable bit savings for 3D mesh models of average or high complexity.

A further advantage of the invention is that both the procedure and the resulting code are substantially shorter than with prior methods.

A further advantage of the invention is that it considers all hierarchy levels of the hierarchical encoding.

While the above examples use a 2-dimensional (2D) model, the same principle can easily be used for 3-dimensional (3D) models. As shown in FIG. 3 a), bounding boxes and cells of 3D implementations are cubes or boxes, i.e. 3D objects with sides that are squares or rectangles. A difference is that in 3D implementations a parent cell is divided not only horizontally and vertically, but also in a third dimension, such as depth. Thus, instead of the division sequence h-v-h-v- . . . (h=horizontal, v=vertical), as used in the above 2D example, or an equivalent division sequence v-h-v-h- . . . , the division sequence for 3D models may be h-v-d-h-v-d-h-v-d- . . . (d=depth), or h-d-v-h-d-v- . . . , or v-d-h-v-d-h- . . . . In any case, recursive splitting refers in a rotating manner to all considered dimensions (a new generation per each dimension).

In one embodiment, also data defining the bounding box are encoded and decoded, e.g. size data and/or position data, in order to allow a reconstruction of a bounding box during decoding.

Figure 3:
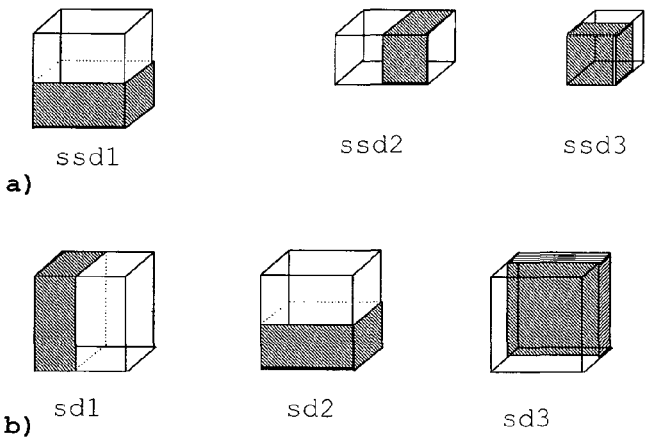
FIG. 3 a) divisions of a 3D parent cell in different dimensions, and b) successive divisions of a 3D parent cell in horizontal, vertical and depth dimension.

FIG. 3 a) shows exemplarily subsequent subdivisions of a 3D box, resulting from horizontal splitting ssd1 of the box, vertical splitting ssd2 of any of the $1^{st}$ generation child cells, and depth splitting ssd3 of any of the $2^{nd}$ generation child cells. It is noted here that the terms "division", "subdivision" and "splitting" are used equivalently herein. FIG. 3 b) shows general horizontal splitting sd1, vertical splitting sd2, and depth splitting sd3. The advantageous effect of the invention is independent from the sequential order of the splitting dimensions (h,v for 2D, and h,v,d for 3D). Therefore the order may be different.

Figure 4:
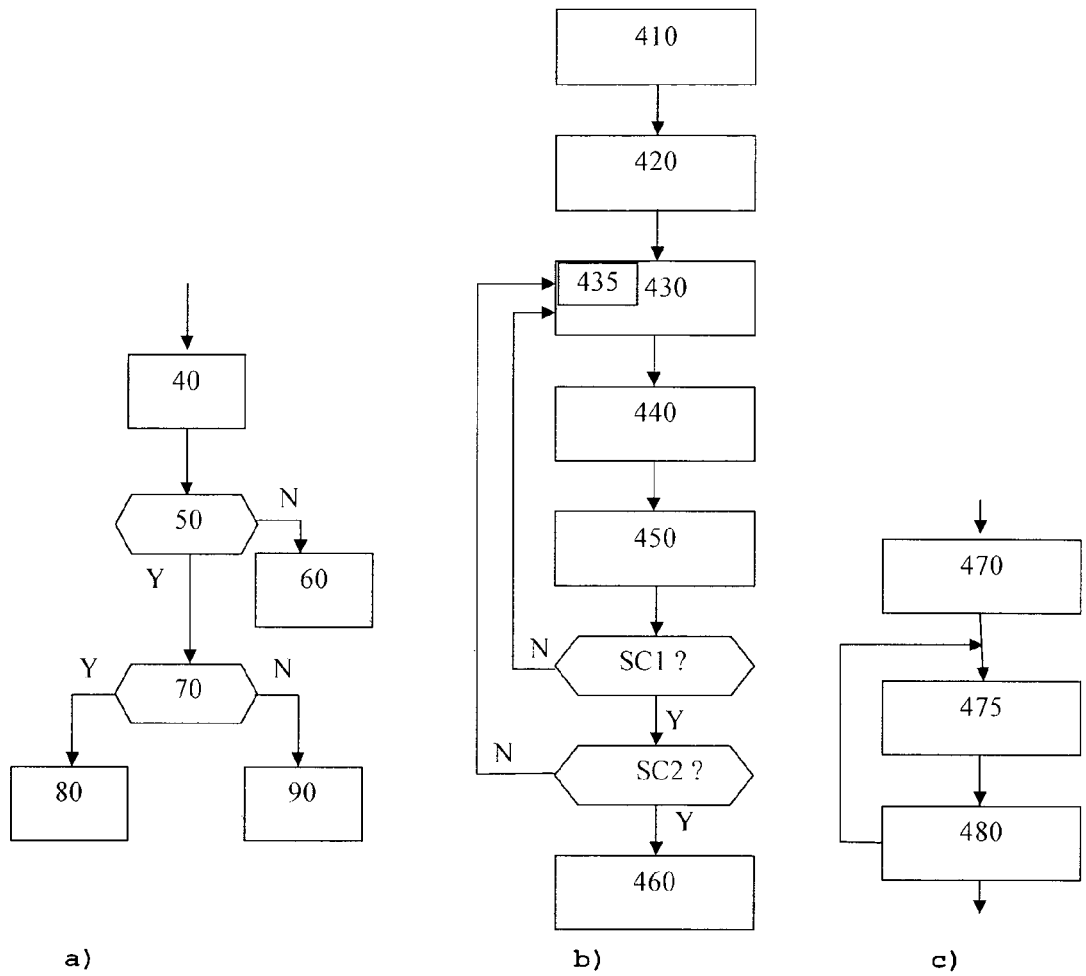
FIG. 4 flow charts of a) coding decision steps, b) an encoding method and c) a decoding method.

FIG. 4 a) shows a flowchart of method steps to be taken during the encoding of positions of a group of points, e.g. the vertex positions of a mesh model. In a first determining step 40, a current parent cell and the total number of points in the current parent cell are determined. In a first coding mode decision step 50, it is determined whether the total number of points in the current parent cell is at least four. If the total number of points in the current parent cell is not at least four (i.e. three or fewer), the next step is a first encoding step 60 for an encoding of the number of points, as described above. That is, the number of points that are within a particular pre-defined one of the child cells (e.g. the left child cell after a vertical subdivision, or the upper child cell after a horizontal subdivision, or in a 3D case the front child cell after depth subdivision) is inserted into the code.

If the total number of points in the current parent cell is at least four, then a second coding mode decision step 70 follows. In the second coding mode decision step 70, it is determined whether the subdivision is effective. If the subdivision is effective, i.e. each child cell has at least one point and no child cell is empty, then a second encoding step 80 determines the number of points in the particular pre-defined one of the child cells, decrements it by one, and inserts an "effective" flag and the decremented number of points into the code. The decrement is advantageous since in after an effective subdivision of a parent cell with p points, each child cell can have not more than p−1 points, and the encoding of p−1 instead of p may save a bit per subdivision.

Otherwise, if the subdivision is non-effective, i.e. at least one child cell is empty, then a "non-effective" bit and the child cell index of the non-empty child cell is inserted into the code in a third encoding step 90. The index is pre-defined, e.g. "1" for left, upper or back child cell and "0" for right, lower or front child cell. It uses $\log_2(k)$ bits when a subdivision results in k child cells.

After each of the first, second and third encoding step, the next parent cell is determined 40, as described below.

Note that, for each dimension, the particular pre-defined one of the child cells (e.g. the left, upper and front child cells)

and the above-mentioned child cell index remain the same during the whole encoding and decoding process.

Generally it is necessary to keep track of the number of points within parent cells, at least within cells that are not empty. E.g. the number of points in a non-empty child cell is stored until, after the next division, the child cell has become a parent cell. Then the number is retrieved from the storage when determining the number of points in the parent cell.

FIG. 4 b) shows a flowchart of a method for encoding a mesh model according to one embodiment of the invention. The method comprises steps of clustering 410 the points according to their spatial coordinates into one or more clusters, and encoding 420-450 the clustered points using a hierarchical tree, wherein the encoding comprises steps of defining 420 a bounding box around the clusters (i.e. around all the points of the model), recursively dividing 430 the bounding box, wherein each dividing step divides a parent cell into a pre-defined number of child cells, for each dividing step, determining 440 for a current parent cell to be divided the number of points, determining if the number of points is at least four, and encoding the number of points if the number is three or fewer, as described above with respect to steps 40,50, 60 of FIG. 4 a), and then encoding 450 the parent cells as described above with respect to steps 70,80,90 of FIG. 4 a).

In one embodiment of the invention, if the determining yields that the number of points in the parent cell is at least four and that the points of the parent cell are distributed to at least two of the child cells, then the dividing step is effective, and a first indication is inserted into the code, and the number of points that are within a particular (pre-defined) one of the child cells is inserted into the code. The first indication indicates the effectiveness of the division (e.g. a single bit set to one). Otherwise, if the determining yields that all points of the parent cell are within a single child cell, then the dividing step is non-effective, and a second indication is inserted into the code, indicating the non-effectiveness of the division (e.g. a single bit set to zero). Then, an index of the single child cell that contains all points is determined and the index is inserted into the code.

In cases where the dividing step results in more than two child cells, different embodiments according to different definitions of effectiveness or non-effectiveness are possible. However, both are complementary, and each dividing step is either effective or non-effective.

In one embodiment, a dividing step is considered effective if the points of the parent cell are distributed to at least two of the child cells (so that all resultant child nodes have fewer data points than the parent node), and non-effective if all points are in only one child cell. In this case, the number of points in each except one of the child cells is required for an effective division (e.g. three values indicating the number of points in three child cells if a division results in four child cells).

In another embodiment, the dividing step is effective if none of the child cells is empty, and non-effective if at least one of the child cells is empty. In this case, either the indices of the empty child cells or of the non-empty child cells can be encoded for a non-effective division, subject to convention.

If the dividing step results in two child cells, both above-described embodiments lead to the same result.

Returning to FIG. 4 b), the recursive division step 430 has in principle two functions: in one function, it processes all non-empty current parent cells. Except for the bounding box, which is the first parent cell, all parent cells are child cells of a previous division step that have become the parent generation. In the example of FIG. 2 b), this means that all non-empty child cells of a current generation, e.g. the generation r2, are sequentially processed, as described above. When all non-empty child cells of the current parent generation are processed, a first stop condition SC1 is fulfilled, and a second function of the recursive division step 430 is performed. In the second function, the splitting dimension is changed 435, which results in the next child cell generation, and the processing of the next generation of non-empty cells begins. E.g. if a current generation is r2 in FIG. 2 b), the next generation is sq2. Thus, the positions of the points are iteratively encoded. The recursive division ends when a second stop condition SC2 is fulfilled, e.g. a minimum child cell size (i.e. a desired spatial resolution) or a maximum number of recursions (i.e. maximum processing time). A pre-defined minimum child cell size corresponds to a target spatial resolution of the encoding process.

Cells of a same size are herein referred to as a generation. As described above, changing 435 the splitting dimensions is performed in an alternating (i.e. rotating) manner with each generation of child cells, e.g. horizontal splitting a cell to obtain first generation child cells, vertical splitting the first generation child cells to obtain second generation child cells, and depth splitting the second generation child cells to obtain a third child cell generation.

Finally, the resulting code may be entropy encoded 460. In one embodiment, all child cells of any one dividing step have equal size.

Corresponding to the above-described method steps shown in FIG. 4 b), in one embodiment of the invention an encoder for encoding a mesh model comprises clustering means for clustering the points according to their spatial coordinates into one or more clusters, and encoding means for encoding the clustered points using a hierarchical tree, wherein the encoding means comprises an initialization unit for defining a bounding box around the clusters, a recursive division unit for recursively dividing the bounding box, wherein each dividing step divides a parent cell into a pre-defined number of child cells, a point distribution determining unit for determining the number of points for each dividing step and for each current parent cell to be divided, and for determining if the number of points per parent cell is at least a minimum number (the number is four if each parent cell is split into two child cells), and an encoding unit for encoding the number of points if the number is below the minimum number, as described above with respect to steps 40,50,60 of FIG. 4 a), and for encoding the parent cells as described above with respect to steps 70,80,90 of FIG. 4 a).

FIG. 4 c) shows, in one embodiment of the invention, a method for decoding a mesh model. It comprises steps of extracting 470 from an encoded data set at least first data, the first data comprising a plurality of code words, and an initial value indicating a total number of points, recursively dividing 475 a bounding box into cells, wherein each of the recursive division divides a current parent cell into a pre-defined number (two or more) of child cells, and determining 480 the positions of said points according to said child cells, wherein the number of points in a current parent cell is determined, a coding mode is detected according to the determined number of points in the current parent cell, and the k−1 next code words are decoded (where k is the number of child cells of a dividing step). The length of each code word is derived from the number of points in the current parent cell. If the determined number of points in the current parent cell is below four, a first decoding mode is used. In the first decoding mode, each code word comprises m bits, where m is generally $\log_2$(number_of_points_in_parent_cell), or an integer according to int($\log_2$(number_of_points_in_parent_cell)). In the first decoding mode, the code word of length m denotes the number of points in a particular pre-defined one of the child cells, as described above.

If the determined number of points in the current parent cell is at least four, the code word comprises an indication for indicating the meaning of the remaining bits of the code word, and the remaining bits of the code word define either a number of points that are positioned within a pre-defined one of the child cells that result from the current division of the current parent cell, if the indication has a first value; or the remaining bits of the code word define an index indicating a child cell that results from the current division of the current parent cell and that includes all the points of the parent cell. The step of determining 480 the positions of said points according to the child cells comprises determining the coding mode and evaluating the indication in the code words. Thus, the positions of the points are iteratively decoded.

Corresponding to the above-described method steps shown in FIG. 4 *c*), in one embodiment of the invention a decoder for decoding a mesh model comprises extraction means for said step of extracting from an encoded data set at least first data and an initial value indicating a total number of points, recursive dividing means (e.g. control means) for said step of recursively dividing a bounding box into cells, wherein each of the recursive division divides a current parent cell into a pre-defined number (two or more) of child cells, and determining means for said step of determining the positions of said points according to said child cells. The determining means comprises a unit for determining the number of points in a current parent cell (e.g. a counter), a coding mode detection unit for detecting a coding mode according to the determined number of points in the current parent cell, and a decoding unit for decoding the k−1 next code words (where k is the number of child cells of a dividing step). A code word length detection unit (e.g. calculator) derives the length of each code word from the number of points in the current parent cell, as described above.

Figure 5:
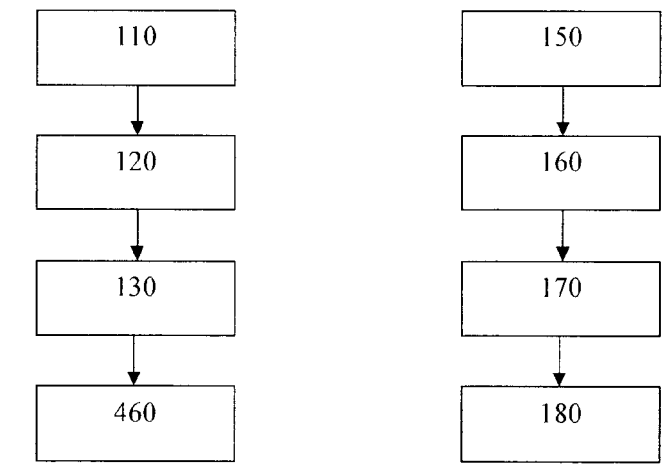
FIG. 5 flow charts of a) an encoding method for a mesh model and b) a decoding method for a mesh model.

FIG. 5 *a*) shows one embodiment of the invention, wherein a method for encoding a mesh model comprises steps of building a generic spatial tree 110 (this is a logical step that may be implicitly included in the next step), analyzing 120 the mesh model according to the generic spatial tree, traversing 130 the spatial tree as described above with respect to blocks 410-450,SC1,SC2 of FIG. 4 *b*), wherein a first encoded representation of the mesh model is obtained, and performing entropy encoding 460 of the first encoded representation of the mesh model, wherein a second encoded representation of the mesh model is obtained.

FIG. 5 *b*) shows an embodiment of the invention, wherein a method for decoding an encoded mesh model comprises steps of performing entropy decoding 150 of the encoded mesh model, wherein an entropy decoded mesh model is obtained, restoring a generic spatial tree 160, restoring spatial point clusters 170 according to the entropy decoded mesh model, wherein the spatial point clusters are mapped to branches and leaves of the spatial tree as described above with respect to FIG. 4 *c*), and restoring spatial points 180 of the mesh model, wherein a spatial position is associated with each point of the mesh model.

The invention can also be used for points that are reference points of components in multi-component or multi-connected (MC) models, i.e. mesh models having many repetitive components, and that denote clusters of vertices of the models. The following two embodiments are particularly advantageous for such MC models. In such case, the various positions of the repetitions of a repetitive component are encoded/decoded separately from the repetitive component as such, which needs to be encoded or decoded only once. During decoding, the repetitive component is copied to each of its decoded positions. For example, in a 3D engineering model of a machine, a screw that is used several times can be encoded as a repetitive component.

In one embodiment, the invention is a method for encoding reference points of components of a mesh model, particularly a MC mesh model, wherein each reference point represents a component and the encoding of the points uses a hierarchical tree, and wherein the encoding comprises steps of defining a bounding box around the points to be encoded, recursively dividing the bounding box, wherein each dividing step divides a parent cell into a pre-defined number of child cells (at least two, wherein in one embodiment all child cells of any one dividing step have equal size), for each dividing step, determining for a current parent cell a total number of points and whether or not all points of the parent cell are within a single child cell, and encoding at least for parent cells that include four or more points an indication that indicates the result of the determining, as described above.

In one embodiment, the invention is a method for decoding, from an encoded data set, reference points of repetitive components of a mesh model, in particular a MC mesh model, and wherein the decoding comprises steps of extracting from the encoded data set at least a value and first data being position data of a plurality of points, the value representing a total number of points and the first data defining a plurality of code words, wherein each code word refers to one of a plurality of recursive divisions of a bounding box into cells, and each division divides a current parent cell into two or more child cells, and determining the positions of said points based on said value and said first data, wherein at least some of the code words comprise an indication (one bit) for indicating whether or not a current cell division step is effective. Further, the method for decoding comprises replacing each point with a repetitive component.

In one embodiment, the invention relates to an encoded mesh model comprising a plurality of repeating connected components, wherein the encoded mesh model comprises encoded data of at least the following:

an instance of each repeating connected component, a total number of encoded connected components, positions of a plurality of repetitions of said repeating connected components, the positions being encoded as a tree structure (e.g. kd-tree), and a bounding region within the mesh model, wherein said bounding region is the initial parent cell to which the tree structure refers. The positions being encoded as a tree use the above-described encoding. I.e., the encoding includes a code word for each node of the tree structure, wherein for nodes with at least four points the code word begins with an indication that has a first value if the points of the current parent cell are distributed to at least two child cells, and that has a different second value if the points of the current parent cell are in a single child cell, and wherein the remaining bits of the code word denote either a number of points that are positioned within a pre-defined one of the child cells (if the indication has the first value) minus one, or denote an index of a child cell of the current parent cell, being the child cell that includes all the points of the parent cell (if the indication has the second value).

Figure 7:
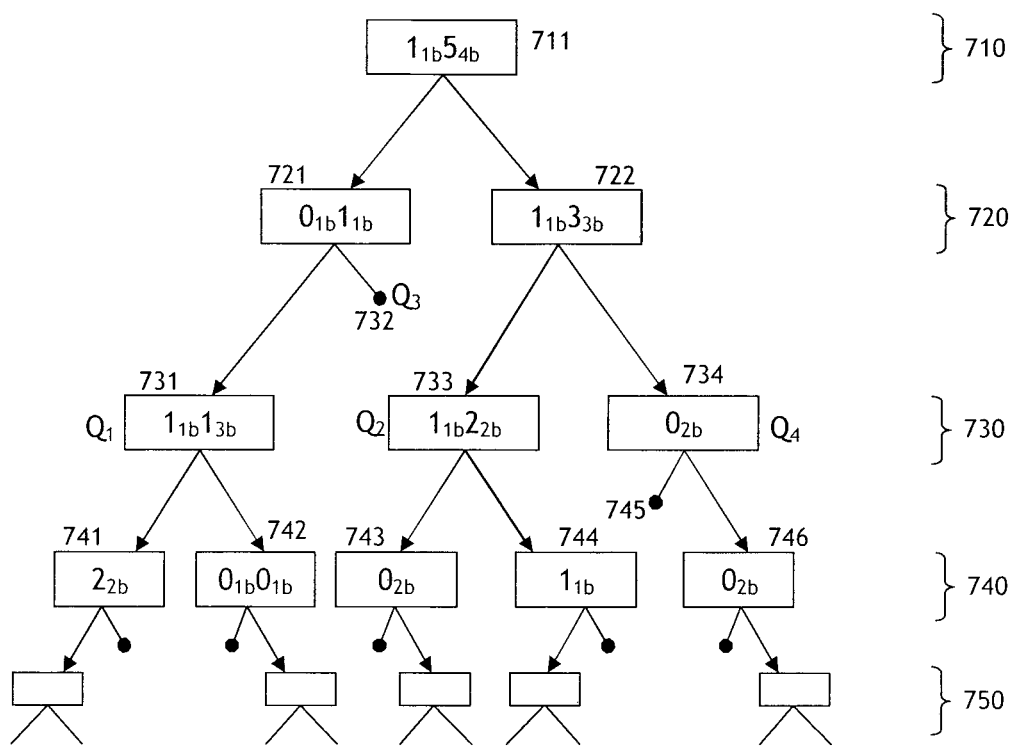
FIG. 7 a code tree.

FIG. 7 shows a part of a tree-type representation of subsequent dividing steps, as described above with respect to FIG. 6. In the root 711 of the tree, a vertical split of the W parent cell is encoded, corresponding to FIG. 6 *b*). As mentioned above, it is a pre-defined convention in this case that the first division is vertical. In the nodes 721,722, horizontal splitting of the resulting child cells is encoded, as shown in FIG. 6 c1) and c2). One of the division steps is non-effective, so that one of its child cells 732 (or Q3) is empty. As explained above, empty child cells are not split and are only implicitly encoded. In the next nodes 731-734, vertical splitting of the $3^{rd}$ generation cells is encoded, as shown in FIG. 6 d1)-d3). The cells correspond to the squares Q1-Q4 in FIG. 2. The following nodes 741-746 correspond to FIG. 6 e1)-e6), wherein again one division is non-effective and thus results in an empty child cell 745. The remaining part of the tree (not shown) can be constructed correspondingly. Each line 710,720,730,740, 750 refers to a generation of cells. The code representing the encoded mesh model according to the invention can be obtained from the lines 710,720,730 etc. when initially the total number of points is inserted.

Generally, the length of the first code word (the total number of points) is fixed, since its length cannot be derived during the decoding. The length of the other code words is variable and their lengths can be calculated during the decoding, as described above. Further, usually all child cells resulting from a single dividing step of a parent cell have substantively equal size.

It is to be noted that the encoding/decoding of points means generally the encoding/decoding of their coordinates herein.

The following exemplary embodiments are particularly advantageous:

In one embodiment of the encoding method, the amount of remaining bits of the code word depends on the number of points in the current parent cell if the indication has the first value, according to n=integer($\log_2$(m+1)), wherein n is the amount of remaining bits of the code word and m is the number of points in the current parent cell.

In one embodiment, the encoding method further comprises an initial step of clustering input points according to their spatial coordinates into one or more clusters, and each of the points is a reference point of a cluster of input points.

In one embodiment of the encoding method, the mesh model is a 3D mesh model with multi-connected components, and each point in a cluster represents a component.

In one embodiment of the encoding method, all child cells resulting from a single dividing step of a parent cell have equal size.

In one embodiment of the encoding method, a maximum number of recursions or a minimum cell size is defined as a terminating condition for the recursive division step.

In one embodiment of the encoding method for 2D, the recursive dividing steps that divide a current parent cell perform horizontal and vertical splitting in an alternating manner, and the pre-defined one of the child cells is either the upper or lower child cell for horizontal splitting, and either the left or right child cell for vertical splitting.

In one embodiment of the encoding method for 3D, the recursive dividing steps that divide a current parent cell perform horizontal, vertical and depth splitting in an alternating manner, wherein the pre-defined one of the child bells is either the upper or lower child cell for horizontal splitting, and is either the left or right child cell for vertical splitting, and is either the front or back child cell for depth splitting.

In one embodiment, wherein the length of each code word is variable, the decoding method further comprises a step of calculating the length of the code word according to a given rule. According to the rule, an amount of said remaining bits of the code word is calculated from the number of points in the current parent cell, according to n=integer($\log_2$(m+1)) or according to n=$\log_2$(m+1), wherein n is the amount of remaining bits of the code word and m is the number of points in the current parent cell.

In one embodiment of the decoding method, the mesh model is a 3D mesh model comprising a plurality of instances of a repeating connected component, and each of said points is a reference point indicating the position of one of said instances, and the method further comprises a final step of generating the plurality of instances of the repeating components and locating each repetition according to the positions of the respective reference point.

In one embodiment of the decoding method, all child cells resulting from a single dividing step of a parent cell have equal size.

In one embodiment of the decoding method, a maximum number of recursions or a minimum cell size is defined as a terminating condition for the recursive division step.

In one embodiment of the decoding method for 2D, the recursive dividing steps that divide a current parent cell perform horizontal and vertical splitting in an alternating manner, and the pre-defined one of the child cells is either the upper or lower child cell for horizontal splitting, and either the left or right child cell for vertical splitting.

In one embodiment of the decoding method for 3D, the recursive dividing steps that divide a current parent cell perform horizontal, vertical and depth splitting in an alternating manner, and the pre-defined one of the child cells is either the upper or lower child cell for horizontal splitting, and is either the left or right child cell for vertical splitting, and is either the front or back child cell for depth splitting.

In one embodiment, an encoded mesh model comprises a plurality of repeating connected components, wherein the encoded mesh model comprises encoded data of at least one instance of each repeating connected component, positions of a plurality of repetitions of said repeating connected components, the positions being encoded as a kd-tree, and a bounding region within the mesh model, wherein said bounding region is the initial parent cell to which the kd-tree refers, wherein the positions that are encoded as a kd-tree use an encoding that includes a code word for each node of the kd-tree, the code word beginning with an indication that has a first value if the points of the current parent cell are distributed to at least two child cells, and that has a different second value if the points of the current parent cell are in a single child cell, and wherein the remaining bits of the code word denote either a number of points that are positioned within a pre-defined one of the child cells (if the indication has the first value), or denote an index of a child cell of the current parent cell, being the child cell that includes all the points of the parent cell (if the indication has the second value).

While there has been shown, described, and pointed out fundamental novel features of the present invention as applied to exemplary embodiments thereof, it will be understood that various omissions and substitutions and changes in the apparatus and method described, in the form and details of the devices disclosed, and in their operation, may be made by those skilled in the art without departing from the spirit of the present invention. For example, although the present invention has been disclosed with regard to bounding boxes that are rectangles having twice the size of squares, one skilled in the art would recognize that the method and devices described herein may be applied to any rectangle boundary box, even if their splitting results in rectangles that are not squares. All above-mentioned conventions can be freely modified without departing from the scope of the invention. Although in the above examples the first division step of a bounding box is vertical, it may also be horizontal. Thus, it is possible to modify the sequential order of a given number of horizontal and vertical division steps.

Further, any implicit convention that is used in the examples may be modified. E.g. with respect to FIG. 2 b) and the related example above, a convention may be that all the current parent cells of a generation (e.g. Q1) are line-wise or column-wise sequentially processed, irrespective of their grand-parent cells. Another convention may be that all the current parent cells of a generation j (e.g. sq1) are line-wise or column-wise sequentially processed within their respective grand-parent cells of any previous generation j-x (e.g. within Q1), before the next grand-parent cell of that generation is entered. Further, another convention may be to switch between the two above conventions at a certain point in the processing, as done in the example described above.

It is expressly intended that all combinations of those elements that perform substantially the same function in substantially the same way to achieve the same results are within the scope of the invention. Substitutions of elements from one described embodiment to another are also fully intended and contemplated.

It will be understood that the present invention has been described purely by way of example, and modifications of detail can be made without departing from the scope of the invention. Each feature disclosed in the description and (where appropriate) the claims and drawings may be provided independently or in any appropriate combination. Features may, where appropriate be implemented in hardware, software, or a combination of the two.

Reference numerals appearing in the claims are by way of illustration only and shall have no limiting effect on the scope of the claims.

The invention claimed is:

1. A method for encoding points of a mesh model using a hierarchical tree, the method comprising:
   encoding a value being the total number of points;
   recursively dividing a bounding box around the points of the mesh model, wherein each recursive dividing divides a current parent cell into a pre-defined number of child cells, and for each dividing of the current parent cell, the method further comprises:
   determining the current parent cell and a total number of points included in the current parent cell;
   determining if the current parent cell includes at least a minimum number of points;
   if the current parent cell includes less than said minimum number of points, encoding a code word that comprises a number of points within a pre-defined one of the child cells, and if the current parent cell includes the same or more than said minimum number of points
      determining a point distribution, to determine whether all points of the current parent cell are within a single child cell according to the dividing of the current parent cell; and
      encoding a code word, wherein the code word begins with an indication value, and wherein
      if not all points of the current parent cell are in a single child cell according to said determined point distribution, the indication value has a first value and remaining bits of the code word denote a number of points, the number being the number of points in a pre-defined one of the child cells decremented by one, and
   wherein if all points of the current parent cell are in a single child cell according to said determined point distribution, the indication value has a different second value and remaining bits of the code word denote an index identifying said single child cell that includes all the points of the parent cell.

2. The method according to claim 1, wherein, if the indication value has the first value, the amount of remaining bits of the code word depends on the number of points in the current parent cell, according to $n=\text{integer}(\log_2(m+1))$ or $n=\log_2(m)$, wherein n is the amount of remaining bits of the code word and m is the number of points in the current parent cell.

3. The method according to claim 1, further comprising clustering input points according to their spatial coordinates into one or more clusters, wherein each of the input points is a reference point of a cluster of a plurality of input points.

4. The method according to claim 3, wherein the mesh model is a 3D mesh model with multi-connected components, and each reference point of a cluster represents a component.

5. The method according to claim 1, wherein said recursive dividing of a current parent cell performs horizontal and vertical splitting in an alternating manner if said mesh model and said bounding box are 2-dimensional, or horizontal, vertical and depth splitting in an alternating manner if said mesh model and said bounding box are 3-dimensional, and wherein the pre-defined one of the child cells is either the upper or the lower child cell for horizontal splitting, and is either the left or the right child cell for vertical splitting, and is either the front or the back child cell for depth splitting.

6. The method according to claim 1, wherein all child cells resulting from a single dividing of a parent cell have equal size.

7. The method according to claim 1, further comprising defining a terminating condition for the recursive dividing by a maximum number of recursions or a minimum cell size.

8. An apparatus comprising a processing element that is adapted for performing a method for encoding points of a mesh model using a hierarchical tree according to claim 1.

9. A non-transitory computer readable storage medium having stored thereon executable instructions to cause a computer to perform a method for encoding mesh models according to claim 1.

10. The method for encoding according to claim 1, wherein the minimum number of points is at least four.

11. A method for decoding points of a mesh model comprising:
   extracting from an encoded data set at least first data, the first data comprising a plurality of code words, and an initial value indicating a total number of points;
   generating a bounding box, based on default data or on bounding box data extracted from the encoded data set;
   recursively dividing a bounding box into cells, wherein each of the recursive division divides a current parent cell into two or more child cells, and wherein a code word defines for a parent cell one of the child cells; and
   determining the positions of said points according to said child cells,
   wherein each of the plurality of code words comprises an indication value for indicating the meaning of the remaining bits of the code word,
   evaluating the indication value, and
   wherein the remaining bits of the code word define either
      a number of points that are positioned within a pre-defined one of the child cells that result from the current division of the current parent cell, if the indication value has a first value, or
      an index indicating a child cell resulting from the current division of the current parent cell,
   wherein the child cell includes all the points of the parent cell.

12. The method according to claim 11, wherein the length of each code word is variable, the method further comprising calculating the length of the code word according to a given rule,
wherein the amount of said remaining bits of the code word is calculated from the number of points in the current parent cell, according to $n=\text{integer}(\log_2(m+1))$, where n is the amount of remaining bits of the code word and m is the number of points in the current parent cell.

13. The method according to claim 11, wherein the mesh model is a 3D mesh model comprising a plurality of instances of a repeating connected component, and wherein each of said points is a reference point indicating the position of one of said instances, the method further comprising a final generating said plurality of instances of the repeating components and locating each repetition according to the positions of the respective reference point.

14. An apparatus comprising a processing element that is adapted to perform a method for decoding points of a mesh model using a hierarchical tree according to claim 11.

15. The method according to claim 11, wherein said recursive dividing that divide a current parent cell perform horizontal and vertical splitting in an alternating manner if said mesh model and said bounding box are 2-dimensional, or horizontal, vertical and depth splitting in an alternating manner if said mesh model and said bounding box are 3-dimensional, and wherein the pre-defined one of the child cells is either the upper or the lower child cell for horizontal splitting, and is either the left or the right child cell for vertical splitting, and is either the front or the back child cell for depth splitting.

16. The method according to claim 11, wherein all child cells resulting from a single dividing of a parent cell have equal size.

17. The method according to claim 11, wherein a maximum number of recursions or a minimum cell size is defined as a terminating condition for the recursively dividing.

18. A non-transitory computer readable storage medium having stored thereon executable instructions to cause a computer to perform a method for decoding mesh models according to claim 11.

19. The method for decoding according to claim 11, wherein if the indication has said first value, the remaining bits of the code word either define the number of points that are positioned within the predefined child cell if the number is below four, or the number of points that are positioned within the predefined child cell are decremented by one if the number is at least four.

20. A non-transitory computer readable storage medium having stored therein an encoded mesh model having a plurality of repeating connected components, wherein the encoded mesh model comprises:
encoded data of at least one instance of each repeating connected component;
a total number of encoded connected components;
positions of a plurality of repetitions of said repeating connected components, the positions being encoded in a tree structure, wherein a node in the tree structure defines a spatial division of a current parent cell; and
a bounding region being the initial parent cell to which the tree structure refers and comprising said total number of encoded connected components, and
wherein the positions that are encoded as a tree structure use an encoding format that includes a code word for each node of the tree structure, the code word beginning with an indication that has a first value if the points of the current parent cell are distributed to at least two child cells, and that has a different second value otherwise, and wherein the remaining bits of the code word denote either a number of points that are positioned within a pre-defined one of the child cells if the indication has the first value, or denote an index of a child cell of the current parent cell, being the child cell that includes all the points of the parent cell if the indication has the second value.

21. The non-transitory computer readable storage medium according to claim 20, wherein subsequent nodes in the tree structure define recursive spatial dividing that divide a current parent cell horizontally and vertically in an alternating manner if said mesh model and said bounding box are 2-dimensional, and that divide a current parent cell horizontally, vertically and depth-dimensionally in an alternating manner if said mesh model and said bounding box are 3-dimensional, and wherein the pre-defined one of the child cells is either the upper or the lower child cell for horizontal dividing, and is either the left or the right child cell for vertical dividing, and is either the front or the back child cell for depth dividing.

22. The non-transitory storage medium according to claim 20, wherein if the indication has the first value, the remaining bits of the code word denote either a number of points that are positioned within the pre-defined child cell if the number is below four, or a number of points that are positioned within the pre-defined child cell decremented by one if the number is at least four.

* * * * *